United States Patent
Young

(10) Patent No.: US 11,021,611 B2
(45) Date of Patent: Jun. 1, 2021

(54) SPRAYABLE COMPOSITION

(71) Applicant: DUPONT SAFETY & CONSTRUCTION, INC., Wilmington, DE (US)

(72) Inventor: Patrick Henry Young, Norton Shores, MI (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

(21) Appl. No.: 16/331,432

(22) PCT Filed: Aug. 22, 2017

(86) PCT No.: PCT/US2017/047894
§ 371 (c)(1),
(2) Date: Mar. 7, 2019

(87) PCT Pub. No.: WO2018/057190
PCT Pub. Date: Mar. 29, 2018

(65) Prior Publication Data
US 2019/0194473 A1    Jun. 27, 2019

Related U.S. Application Data

(60) Provisional application No. 62/398,546, filed on Sep. 23, 2016.

(51) Int. Cl.
| | | |
|---|---|---|
| *C09D 5/00* | (2006.01) | |
| *C09D 7/63* | (2018.01) | |
| *C09D 171/00* | (2006.01) | |
| *C08K 5/103* | (2006.01) | |

(52) U.S. Cl.
CPC ............... *C09D 5/00* (2013.01); *C08K 5/103* (2013.01); *C09D 7/63* (2018.01); *C09D 171/00* (2013.01)

(58) Field of Classification Search
CPC .......... C09D 5/00; C09D 7/63; C09D 171/00; C08K 5/103
USPC ..................................................... 524/308
See application file for complete search history.

(56) References Cited

U.S. PATENT DOCUMENTS

| | | |
|---|---|---|
| 6,579,924 B2 | 6/2003 | Georgeau et al. |
| 2012/0207998 A1 | 8/2012 | Ando |
| 2016/0326344 A1* | 11/2016 | Yano .................... C08L 101/10 |

FOREIGN PATENT DOCUMENTS

| | | |
|---|---|---|
| WO | 2011/000737 A1 | 1/2011 |
| WO | 2015/098998 A1 | 7/2015 |

OTHER PUBLICATIONS

Fedors, Robert F., "A Method for Estimating Both the Solubility Parameters and Molar Volumes of liquids", Polymer Engineering and Science, Feb. 1974, vol. 14, No. 2.

* cited by examiner

*Primary Examiner* — Kelechi C Egwin

(57) ABSTRACT

A composition comprises an alpha, omega-telechelic silyl-terminated polymer and a plasticizer wherein (i) the Fedors Solubility Parameter difference between the polymer and the plasticizer is no greater than 0.8, (ii) the polymer plus plasticizer comprises from 30 to 80 weight percent of the composition, and (iii) the polymer comprises from 10 to 70 weight percent of the combined weight of polymer and plasticizer.

8 Claims, No Drawings

SPRAYABLE COMPOSITION

BACKGROUND

1. Field of the Invention

This invention is directed to a sprayable composition suitable for use in the construction industry as a water-resistant membrane.

2. Description of Related Art

Water-resistant elastomeric coatings are applied to oriented strand board, plywood, concrete, cement or gypsum board surfaces of buildings. These coatings which are typically about 0.2-2.0 mm thick may be applied by a roller or a spray. Spraying options are preferred for efficiency reasons. High pressure spraying at 275 bar or higher (4,000 psi) is required for some coating mixtures. There remains an ongoing need for improved high solids water barrier elastomeric coatings that may be sprayed at a lower pressure such as 275 bar (4,000 psi) or even 207 bar (3,000 psi).

PCT publication No. WO11000737 to Schindler et al. discloses a two-component adhesive or sealing compounds (K), comprising a first component (K1), containing silane-terminated prepolymers (A), which have end groups of the general formula (II) —O—CO—NH—$(CH_2)_y$—$SiR^2_{3-x}(OR^1)_x$ (II), where $R^1$ and $R^2$ independently from each other are hydrocarbon groups having 1-18 carbon atoms or ω-oxaalkyl-alkyl groups having in total 2-20 carbon atoms, x is 2 or 3, and y is a number from 1 to 10, and a second component (K2), containing water, provided that at least 50% of all prepolymer molecules (A) do not have any additional urethane or urea units in the backbone of the prepolymer chain.

U.S. Pat. No. 6,579,924 to Georgeau et al describes a one-part pourable sealant that is thermosetting, non-shrinking, and capable of quickly curing in a closed cavity to a depth of at least two inches includes a silyl-terminated polymer, a hygroscopic plasticizer present in an amount that is effective to promote rapid and deep curing, and a catalyst for promoting curing of the silyl-terminated polymer. The sealer composition is useful in a method of forming a seal around a roof penetration. The method includes dispensing the sealer composition into a pitch pocket formed around a roof penetration and allowing the sealer composition dispensed into the pitch pocket to cure by exposure to moisture in the air.

United States Patent Application Publication No. 2012/0207998 pertains to a liquid-applied moisture-permeable waterproofing material that can protect a building from rainwater or humidity in the air, can drain moisture which has been gathered on a substrate of a building, and can be applied easily. Disclosed is a curable composition comprising: (A) a polyoxyalkylene polymer having a silicon-containing group crosslinkable by forming a siloxane bond; (B) a polyoxyalkylene plasticizer whose main chain contains 5 wt % or more of an oxypropylene-derived repeating unit and has one or more groups, at an end thereof, selected from the group consisting of an —OH group, a group represented by the formula: —$OR^9$ (wherein $R^9$ is a substituted or unsubstituted $C_{1-20}$ hydrocarbon group), and a group represented by the formula: —$NR^{10}_2$ (wherein $R^{10}$ is each independently a hydrogen atom, or a substituted or unsubstituted $C_{1-20}$ hydrocarbon group).

SUMMARY OF THE INVENTION

This invention pertains to a composition comprising an alpha, omega-telechelic silyl-terminated polymer and a plasticizer wherein (i) the Fedors Solubility Parameter difference between the polymer and the plasticizer is no greater than 0.8,
(ii) the polymer plus plasticizer comprises from 30 to 80 weight percent of the composition, and
(iii) the polymer comprises from 10 to 70 weight percent of the combined weight of polymer and plasticizer.

DETAILED DESCRIPTION

Coating Composition

Two of the components of a composition suitable for use as a water-resistant coating for a building are an alpha, omega-telechelic silyl-terminated polymer and a plasticizer. It is a requirement of the composition that the Fedors Solubility difference between the polymer and the plasticizer is no greater than 0.8. More preferably the Fedors Solubility difference should be no greater than 0.5. The Fedors Solubility Parameter calculation is a well known method for estimating solubility parameters, heat of vaporization, and molar volumes of liquids.

The polymer plus plasticizer comprises from 30 to 80 weight percent of the composition. If the weight percent of polymer plus plasticizer in the composition is less than 30 percent, then appropriate physical properties and water barrier penetration is not achieved. If the weight percent of polymer plus plasticizer in the composition is greater than 80 percent, then desired rheological and application properties are compromised. In one embodiment, the plasticized binder of polymer plus plasticizer, comprises about 58 weight percent of the composition, pigments and fillers about 35 weight percent of the composition, other functional additives about 6 weight percent of the composition and a curing catalyst about 1 weight percent.

Preferably the polymer comprises from 10 to 70 weight percent of the combined weight of polymer and plasticizer and the plasticizer from 30 to 90 weight percent of the combined weight.

In one embodiment, the composition has a viscosity of no greater than 4 Pascal seconds (Pa S) when measured at 1000 cps on a parallel plate rheometer. In another embodiment, the viscosity is no greater than 3 Pa S.

Polymer and Plasticizer

Preferably, the alpha, omega-telechelic silyl-terminated polymer is a silylated polyurethane, a silylated polyether, a silylated polyester or a silylated acrylate. The starting viscosity of the polymer will significantly control the final viscosity of the weather barrier mixture. Preferably the polymer viscosity is no greater than 20 Pascal seconds at 1000 cps so as to provide a final mixture viscosity of no greater than 4.0 Pascal seconds at 1000 cps.

Preferably, the plasticizer is a liquid at room temperature which is typically from about 20-25 degrees C. In preferred embodiments, the plasticizer is a glycol such as a glycol diester. A suitable glycol is a mono, di, tri, tetra or neo substituted ethyl, propyl, butyl, or pentyl moiety. A preferred diester is a hexanoate, heptanoate or octanoate.

Test Methods

The viscosity of the composition was measured at 1000 cps on a parallel plate rheometer and is reported in Pa S.

Examples

Examples prepared according to current invention are indicated by numerical values. Control or Comparative Examples are indicated by letters.

Table 1 shows the viscosity, molecular weight and solubility parameters of the different polymers and plasticizers used in the examples.

TABLE 1

| Supplier | Composition | | Viscosity* (Pa S) | Molecular Weight | Solubility Parameter |
|---|---|---|---|---|---|
| Kaneka, Pasadena, Texas | SAX 350 | Silyl Terminated Polyether | 6.5 | | 8.6 |
| Risun, Taizhou, China | 15000T | Silyl Terminated Polyether | 15 | | 8.6 |
| Monument, Houston, Texas | PPG 20-112 | Polypropylene glycol | | 1000 | 9.6 |
| Monument, Houston, Texas | PPG 20-150 | Polypropylene glycol | | 750 | 9.71 |
| BASF, Florham Park, NJ | Platinol TOTM | TriOctyl TriMellitate | | 547 | 9.74 |
| Eastman Chemicals, Johnson City, Tennessee | TEG EH | Triethylene Glycol Bis (2-ethyl Hexanoate) | | 401 | 9.01 |
| Kingston Chemistry, Kingston, India | KST-09128422 | Triethylene Glycol di-n-heptanoate | | 374.5 | 9.28 |
| Haihang, Shandong, China | TEG DH | Tetraethylene Glycol di-n-Heptanoate | | 418.5 | 9.29 |
| Chemos, Gmbh | | Neopentyl Glycol di-n-heptanoate | | 328.4 | 8.92 |
| Lubrizol, Cleveland, Ohio | Schercemol NGDO | Neopentyl Glycol di-n-Octanoate | | 356.5 | 8.89 |

*Taken from vendor's datasheets of Sep. 13, 2016

Tables 2A-2C Show the Compositions on Inventive Examples 1-10 and Comparative Examples 1-3

TABLE 2A

| Component Reference | Component Name | Grade |
|---|---|---|
| 1 | Silyl Terminated Polyether | SAX350 |
| 2 | Silyl Terminated Polyether | 15,000T |
| 3 | Triethylene Glycol Bis (2-ethyl Hexanoate) | TEG EH |
| 4 | Triethylene Glycol di-N-Heptanoate | KST-09128422 |
| 5 | Tetraethylene Glycol di-N-Heptanoate | TEG DH |
| 6 | Neopentyl Glycol di-N-Heptanoate | |
| 7 | Neopentyl Glycol di-N-Octanoate | Schercemol NGDO |
| 8 | Polypropylene Glycol | PolyG 20-112 |
| 9 | Polypropylene Glycol | PolyG 20-150 |
| 10 | TriOctyl TriMellitate | TOTM |
| 11 | Colloidal Calcium Carbonate | Ultra Plex |
| 12 | Ground Calcium Carbonate | Hubercarb G2T |
| 13 | Titanium Dioxide | TiPure R902 |
| 14 | Thixotropic Agent | Crayvallac SL |
| 15 | UV Absorber | Tinuvin 328 |
| 16 | Light Stabilizer | Tinuvin 770 |
| 17 | Dehydration Agent | A-171 |
| 18 | Silane Coupling Agent | A-1120 |
| 19 | Curing Catalyst | Neostan U-220H |

TABLE 2B

| Component Ref. | Examples | | | | | | | | | |
|---|---|---|---|---|---|---|---|---|---|---|
| (Parts by weight) | 1 | 2 | 3 | 4 | 5 | 6 | 7 | 8 | 9 | 10 |
| 1 | 100 | 100 | 100 | 100 | 100 | | | | | |
| 2 | | | | | | 100 | 100 | 100 | 100 | 100 |
| 3 | 65 | | | | | | | | | 65 |
| 4 | | 65 | | | | | 65 | | | |
| 5 | | | 65 | | | | | 65 | | |
| 6 | | | | 65 | | | | | 65 | |
| 7 | | | | | 65 | | | | | |
| 11 | 30 | 30 | 30 | 30 | 30 | 30 | 30 | 30 | 30 | 30 |
| 12 | 50 | 50 | 50 | 50 | 50 | 50 | 50 | 50 | 50 | 50 |
| 13 | 20 | 20 | 20 | 20 | 20 | 20 | 20 | 20 | 20 | 20 |
| 14 | 1.5 | 1.5 | 1.5 | 1.5 | 1.5 | 1.5 | 1.5 | 1.5 | 1.5 | 1.5 |
| 15 | 1 | 1 | 1 | 1 | 1 | 1 | 1 | 1 | 1 | 1 |
| 16 | 1 | 1 | 1 | 1 | 1 | 1 | 1 | 1 | 1 | 1 |
| 17 | 4 | 4 | 4 | 4 | 4 | 4 | 4 | 4 | 4 | 4 |
| 18 | 9 | 9 | 9 | 9 | 9 | 9 | 9 | 9 | 9 | 9 |
| 19 | 0.8 | 0.8 | 0.8 | 0.8 | 0.8 | 0.8 | 0.8 | 0.8 | 0.8 | 0.8 |
| TOTAL | 282.3 | 282.3 | 282.3 | 282.3 | 282.3 | 282.3 | 282.3 | 282.3 | 282.3 | 282.3 |

TABLE 2C

| Component Ref. | Comparative Examples | | |
|---|---|---|---|
| (Parts by weight) | A | B | C |
| 1 | 100 | 100 | 100 |
| 8 | 65 | | |
| 9 | | 65 | |
| 10 | | | 65 |
| 11 | 30 | 30 | 30 |
| 12 | 50 | 50 | 50 |
| 13 | 20 | 20 | 20 |
| 14 | 1.5 | 1.5 | 1.5 |
| 15 | 1 | 1 | 1 |
| 16 | 1 | 1 | 1 |
| 17 | 4 | 4 | 4 |
| 18 | 9 | 9 | 9 |
| 19 | 0.8 | 0.8 | 0.8 |
| TOTAL | 282.3 | 282.3 | 282.3 |

According to the formulation examples shown in Table 2, a polymer, a plasticizer, a filler, a thixotropic agent, various stabilizers, a dehydration agent, an adhesion promoter, a curing catalyst etc. were measured and kneaded with a high shear mixer under dehydrating conditions with a nitrogen purge. Thereafter, the material was sealed in a moisture proof container (5-gallon bucket). The compounding agents other than the polymer and plasticizer are shown below. Colloidal Calcium Carbonate Ultra-Pflex (Specialty Minerals Inc.), ground Calcium Carbonate filler Hubercarb G2T (Huber Engineered Materials), Titanium Dioxide R-902 (Chemours), thixotropic agent Cravallac SL (Cray Valley), ultraviolet absorber and light stabilizer Tinuvin 328 and Tinuvin 770 respectively (Ciba Specialty Chemicals), dehydrating agent A-171 (Momentive Performance Materials), coupling agent A-1120 (Momentive Performance Materials), Curing catalyst Neostan U-220H (Nitto Kasei Co., Ltd.).

Table 3 shows the resulting viscosity of the final composition and the Fedors Solubility Parameter Difference between the polymer and plasticizer.

TABLE 3

| Examples | Viscosity (Pa S) | Solubility Difference |
|---|---|---|
| 1 | 2.0 | 0.41 |
| 2 | 2.7 | 0.68 |
| 3 | 2.8 | 0.69 |
| 4 | 2.5 | 0.32 |
| 5 | 2.5 | 0.29 |
| 6 | 3.8 | 0.63 |
| 7 | 3.8 | 0.64 |
| 8 | 3.7 | 0.27 |
| 9 | 3.7 | 0.24 |
| 10 | 3.5 | 0.41 |

TABLE 3-continued

| Examples | Viscosity (Pa S) | Solubility Difference |
|---|---|---|
| Comparative A | 4.7 | 1.0 |
| Comparative B | 4.5 | 1.11 |
| Comparative C | 5.0 | 1.14 |

The resulting compositions from Examples 1 to 5 had a viscosity at 1000 cps, that ranged from 2.0 (Pa S) to 2.8 (Pa S) and a Fedors Solubility Parameter difference of less than 0.8. The compositions were evaluated for spraying capability in a Graco Mark V airless sprayer with a 631 spray tip and was found to be sprayable at pressures of about 3200 psi. Compositions 6-10 had a final viscosity at 1000 cps ranging from 3.5 to 3.8 Pa S and a Fedors Solubility Parameter difference of less than 0.8. They were sprayable at 4000 psi with a 631 spray tip. Examples 6 to 10 had a higher final viscosity because the starting viscosity of the alpha, omega-telechelic silyl terminated polymer was higher.

The resulting compositions from Comparative Examples A to C had a viscosity that ranged from 4.7 cps to 5.0 with a Fedors Solubility difference of greater than 1.0. The compositions were evaluated for spraying capability and found not to spray in a Graco Mark V airless sprayer. However, the compositions could be sprayed in a Graco X-90 airless sprayer at about 6000 psi with a 631 spray tip.

What is claimed is:

1. A composition comprising an alpha, omega-telechelic silyl-terminated polymer and a plasticizer wherein
   (i) the Fedors Solubility Parameter difference between the polymer and the plasticizer is no greater than 0.8,
   (ii) the polymer plus plasticizer comprises from 30 to 80 weight percent of the
   (iii) composition, and the polymer comprises from 10 to 70 weight percent of the combined weight of polymer and plasticizer,
   wherein the composition has a viscosity of no greater than 4 Pa S when measured at 1000 cps on a parallel plate rheometer.

2. The composition of claim 1 wherein the Fedors Solubility Parameter difference is no greater than 0.5.

3. The composition of claim 1 wherein the alpha, omega-telechelic silyl-terminated polymer is a silylated polyurethane, a silylated polyether, a silylated polyester or a silylated acrylate each with a viscosity no greater than 20 Pa S.

4. The composition of claim 1 wherein the plasticizer is a glycol.

5. The composition of claim 4 wherein the glycol is a glycol diester.

6. The composition of claim 1 wherein the composition has a viscosity of no greater than 3 Pa S when measured at 1000 cps on a parallel plate rheometer.

7. The composition of claim 4 wherein the glycol is a mono, di, tri, tetra or neo substituted ethyl, propyl, butyl, or pentyl moiety.

8. The composition of claim 5 wherein the diester is a hexanoate, heptanoate or octanoate.

* * * * *